(12) United States Patent
Yoon et al.

(10) Patent No.: US 8,739,232 B2
(45) Date of Patent: May 27, 2014

(54) IPTV DATA COLLECTION APPARATUS AND METHOD BASED ON MULTI-CAST

(75) Inventors: Hyeon Sik Yoon, Daejeon-si (KR); Hea Sook Park, Daejeon-si (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 13/617,407

(22) Filed: Sep. 14, 2012

(65) Prior Publication Data

US 2013/0167183 A1 Jun. 27, 2013

(30) Foreign Application Priority Data

Dec. 23, 2011 (KR) .................. 10-2011-0141541

(51) Int. Cl.
*H04N 7/173* (2011.01)
(52) U.S. Cl.
USPC ............................. 725/93; 725/87; 725/109
(58) Field of Classification Search
USPC ............................................. 725/87, 93, 109
See application file for complete search history.

(56) References Cited

U.S. PATENT DOCUMENTS

| 2009/0094640 | A1* | 4/2009 | Anderson et al. ............... 725/34 |
| 2011/0106915 | A1 | 5/2011 | Kim et al. |
| 2012/0210350 | A1* | 8/2012 | McCoy et al. ................... 725/34 |

FOREIGN PATENT DOCUMENTS

KR 1020080055338 6/2008

* cited by examiner

*Primary Examiner* — Hunter B Lonsberry
(74) *Attorney, Agent, or Firm* — Nelson Mullins Riley & Scarborough LLP; Anthony A. Laurentano, Esq.

(57) ABSTRACT

Disclosed is an Internet protocol television (IPTV) data collection apparatus including: a transmission path setting unit acquiring a transmission path of an IPTV provider and setting a communication path with respect to a terminal of the transmission path; a message transmitting and receiving unit transmitting a multicast message to at least one terminal belonging to the transmission path and receiving a response message including information related to the IPTV provider and corresponding to the transmitted multicast message; and a data storing unit storing the information related to the IPTV provider, and a method thereof.

13 Claims, 5 Drawing Sheets

IPTV DATA COLLECTION APPARATUS AND METHOD BASED ON MULTI-CAST

CROSS-REFERENCE TO RELATED APPLICATIONS

This application claims priority to and the benefit of Korean Patent Application No. 10-2011-0141541 filed in the Korean Intellectual Property Office on Dec. 23, 2011, the entire contents of which are incorporated herein by reference.

TECHNICAL FIELD

The present invention relates to an Internet protocol television (IPTV) data collection apparatus and method based on multicast, and a recording medium thereof, and more particularly, to an IPTV data collection apparatus and method of obtaining information related to an IPTV provider using a multicast message, and a recording medium thereof.

BACKGROUND ART

A broadcasting network according to the related art is divided into a terrestrial broadcasting network and a cable broadcasting network, and information on a specific broadcasting channel is very important in these broadcastings. For example, as an existing audience rating research method used to obtain information on an audience rating, there are a diary method of distributing a booklet in which research contents are printed to viewers to allow the viewers to write their exposure record, an interview research method subdivided into a visiting research method and a telephone research method, a meter research method of attaching a device such as a people meter, an audiometer, or the like, to a television under the consent of a subscriber to automatically record viewing behavior and transmitting the recorded data to a research center through a telephone line, and the like.

In the cases of the diary research and the interview research of the above-mentioned research methods, the research is dependent on a memory of human, such that reliability of the research may be deteriorated, and in the case of the meter research method, installation of the meter may be complicated and expensive, absolute cooperation of a responder is required, data on all of customers receiving services can not be collected, such that reliability of statistical data may be deteriorated.

Korean Patent Application No. 1997-0041880 disclosed a technology of automatically researching the audience rating at each TV broadcasting station. According to this technology, when the TV broadcasting station vertical blanking interval (VBI)-encodes a viewing channel searching command in a TV broadcasting signal to broadcast the TV broadcasting signal and the VBI that is the viewing channel searching command is decoded in a step in which a television receives the TV broadcasting signal, electronic mail (E-mail) including information on currently viewed channels are written and are transmitted to the TV broadcasting station, such that the TV broadcasting station may collect and analyze the received e-mail to utilize the information as sources of the audience rating research.

However, since this method also depends on hands of an operator in collecting and analyzing the e-mail information transmitted from each TV to the TV broadcasting station, this method may also be significantly difficult and troublesome.

The TV broadcasting station should VBI-encode a separate channel searching command in each of broadcasting program data. Therefore, data loss of regular broadcasting may be generated.

Although a sample research may also be conducted by installing a measuring device to a specific subscriber group using the existing method in the Internet protocol television (IPTV) broadcasting, a complete research rather than the sample research may be conducted using more advanced Internet technology without installation of the measuring device to obtain the information in the IPTV broadcasting.

For example, in the case of an audience rating research of a multicast based IPTV, on the assumption that a single IPTV broadcasting channel corresponds to a single multicast group, an audience rating of the corresponding IPTV broadcasting channel may be recognized by recognizing the number of members included in the related multicast group.

However, a current multicast technology recognizes only whether or not a member of the corresponding multicast group is present, but may not recognize how many members are present. Therefore, the present invention suggests an apparatus and method of collecting an audience rating of a specific IPTV broadcasting channel and additional information thereof using a method of recognizing the member of source based multicast tree.

SUMMARY OF THE INVENTION

The present invention has been made in an effort to provide an Internet protocol television (IPTV) data collection apparatus and method capable of acquiring a reliable audience rating information in a state in which additional cost is not separately generated by collecting information related to the IPTV such as an audience rating of a specific IPTV broadcasting channel, additional information, and the like, through a complete research using a multicast message in an existing multicast based IPTV broadcasting network.

An exemplary embodiment of the present disclosure provides an Internet protocol television (IPTV) data collection apparatus including: a transmission path setting unit acquiring a transmission path of an IPTV provider and setting a communication path with respect to a terminal of the transmission path; a message transmitting and receiving unit transmitting a multicast message to at least one terminal belonging to the transmission path and receiving a response message including information related to the IPTV provider and corresponding to the transmitted multicast message; and a data storing unit storing the information related to the IPTV provider.

Another exemplary embodiment of the present disclosure provides an IPTV data collection method including: a transmission path setting step of acquiring a transmission path of an IPTV provider and setting a communication path with respect to a source terminal of the transmission path; a message transmitting and receiving step of transmitting a multicast message to at least one terminal belonging to the transmission path and receiving a response message including information related to the IPTV provider and corresponding to the transmitted multicast message; and a data storing step of storing the information related to the IPTV provider.

Yet another exemplary embodiment of the present disclosure provides an IPTV data collection method including: a transmission path setting step of acquiring a transmission path of an IPTV provider and setting a communication path with respect to a source terminal of the transmission path; a multicast message generating step of generating a multicast message for transmitting to at least one terminal belonging to the transmission path; an additional information receiving step of receiving additional information of the IPTV provider set by a user based on the multicast message; a response message generating step of generating a response message including information related to the IPTV provider corresponding to the transmitted multicast message and the received additional information of the IPTV provider; and a data storing step of storing the information related to the IPTV provider.

An advertising market is an important source of income of the IPTV provider providing IPTV broadcasting and needs to be activated in a current situation in which a killer application is insufficient. However, in order to promote desired effect of the corresponding advertisement to advertisers, objective information on the audience rating of the corresponding IPTV broadcasting, or the like is required. Therefore, according to the present invention, since the information related to IPTV based on the complete research is provided, an accurate ground for calculation of an advertising cost and desired effect of the advertisement may be provided. Therefore, the present invention may contribute to the enlargement of the advertising market in the IPTV broadcasting.

The foregoing summary is illustrative only and is not intended to be in any way limiting. In addition to the illustrative aspects, embodiments, and features described above, further aspects, embodiments, and features will become apparent by reference to the drawings and the following detailed description.

Figure 1:
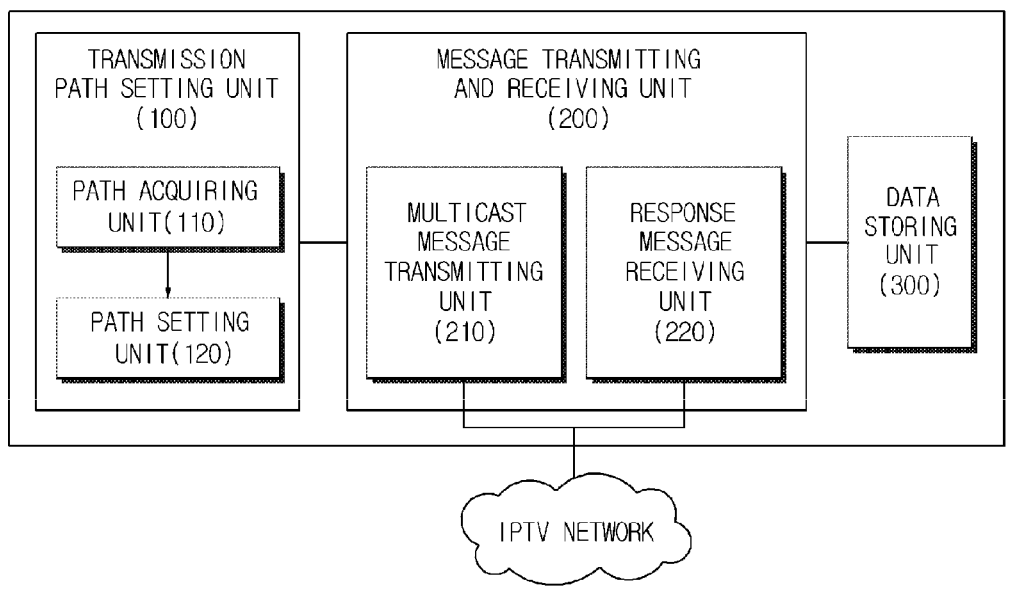
FIG. 1 is a block diagram of an IPTV data collection apparatus according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, exemplary embodiments of the present invention will be described in detail with reference to the accompanying drawings. First of all, we should note that in giving reference numerals to elements of each drawing, like reference numerals refer to like elements even though like elements are shown in different drawings. In describing the present invention, well-known functions or constructions will not be described in detail since they may unnecessarily obscure the understanding of the present invention. It should be understood that although exemplary embodiment of the present invention are described hereafter, the spirit of the present invention is not limited thereto and may be changed and modified in various ways by those skilled in the art.

In the implementation by the hardware, a method according to exemplary embodiments of the present invention may be implemented by application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, or the like.

In the implementation using the firmware or the software, a method according to exemplary embodiments of the present invention may be implemented by modules, procedures, functions, or the like, that perform functions or operations described above. Software codes are stored in a memory unit and may be driven by a processor. The memory unit is disposed in or out the processor and may transmit and receive data to and from the well-known various means.

Specific terms used in the following description are provided to help understand the present invention. The use of the specific terms may be changed into other forms without departing from the technical idea of the present invention.

An IPTV data collection apparatus according to an exemplary embodiment of the present invention will be described with reference to FIG. 1. The IPTV data collection apparatus includes a transmission path setting unit 100, a message transmitting and receiving unit 200, and a data storing unit 300.

The transmission path setting unit 100 acquires a multicast transmission path of an IPTV provider and sets a communication path with respect to a terminal of the transmission path. The transmission path setting unit 100 includes a path acquiring unit 110 and a path setting unit 120.

The IPTV provider means an apparatus transmitting multicast based broadcasting stream or an IPTV broadcasting server. The transmission path includes a path through which a message is multicast-transmitted.

In the multicast transmission, an address of a group to which the receivers belong is marked in a header instead of addresses of receivers and a packet is then transmitted. The group address for the multicast transmission is a D-class IP address (224.0.0.0~239.255.255.255) and is not an address indicating a real host unlike A, B, or C-class IP address indicating an individual internal host all over the world. Therefore, a receiver receiving a multicast packet having the group address determines whether the receiver belongs to the group of the packet and decides whether to receive the packet or not.

The path acquiring unit 110 acquires the transmission path by performing traceroute on the IPTV provider. The traceroute, which is a program of tracing a path through which an Internet protocol (IP) datagram is transmitted from a source terminal to a target terminal, is implemented by setting an Internet control message protocol (ICMP) message and a time-to-live (TTL) field of the corresponding IP header in the IP datagram. Therefore, the path acquiring unit 110 performs the traceroute to acquire information on a router present in the path from the source terminal to the target terminal.

A network address such as an IP address of the IPTV provider, or the like, for performing the traceroute may be set in advance or be received from a user. The path acquiring unit 110 performs the traceroute on the IPTV provider having the set network address to acquire the transmission path of the IPTV provider or acquires network addresses of the source terminal directly received data from the IPTV provider, the router, or a first hop router (FHR).

According to the exemplary embodiment of the present invention, an IPTV providing apparatus acquires the network address of the source terminal or the FHR with respect to the transmission path through which broadcasting stream of the IPTV provider is transmitted, thereby performing the multicast using the same path as the transmission path of the broadcasting stream of the IPTV.

The path setting unit 120 sets the communication path using the tunneling with respect to the source terminal of the transmission path. The source terminal means a terminal to be used as a reference in the multicast path with respect to the corresponding IPTV provider. For example, the source terminal may be implemented by a FHR of the multicast shortest-path tree (SPT) for the IPTV provider. The path setting unit 120 may perform the tunneling on the terminal set as the source terminal.

The tunneling means transmitting an encapsulated packet between multicast routers. IP addresses of both ends of a tunnel set between the multicast routers is added to front of a data packet header having the multicast address to thereby be routed, using the tunneling, such that when the data packet passes through general routers that do not support the multicast, the data packet may be routed in the same method as that of the existing unicast packet to thereby be finally transmitted to an end of the tunnel.

According to the exemplary embodiment of the present invention, the path setting unit 120 acquires the FHR network address of the multicast SPT with respect to the IPTV provider that becomes a target of the traceroute through the traceroute. The path setting unit 120 sets an IP-in IP tunnel in advance with respect to the FHR of which the network address is acquired or generates an IP-in-IP tunnel using a control message.

The message transmitting and receiving unit 200 transmits a multicast message to at least one terminal belonging to the transmission path and receives a response message including information related to the IPTV provider, corresponding to the multicast message. The message transmitting and receiving unit 200 includes a multicast transmitting unit 210 and a response message receiving unit 220.

The multicast transmitting unit 210 transmits the multicast message to at least one terminal belonging to the transmission path using the set communication path.

According to the exemplary embodiment of the present invention, the multicast message is transmitted to the source terminal or the FHR of the transmission path using the tunneling, and a multicast message received in the FHR using the tunneling is transmitted. Therefore, although the transmission path of the broadcasting stream of the IPTV provider is not known, the multicast message may be transmitted using the same path as the transmission path of broadcasting stream of the IPTV provider.

The multicast message, which is a message including information for determining whether the message arrives at at least one terminal belonging to the transmission path, includes an inner IP header, an outer IP header, and an ICMP message. As an exemplary embodiment of the present invention, the multicast message transmitted to the transmission path of the IPTV provider may be implemented using a multicast ping. The ping is a program of determining whether or not a multicast message may arrive at a specific terminal in a network and is implemented using an ICMP echo request message and an ICMP echo reply message. When the multicast message including the ICMP echo request message arrives at the FHR of the corresponding multicast SPT, the FHR receiving the multicast message transmits the multicast message to the corresponding multicast SPT. The multicast message including the ICMP echo request message transmitted to the SPT is transmitted to the terminal belonging to the transmission path through the same path as that of the broadcasting stream in the multicast scheme.

At least one terminal belonging to the transmission path means an apparatus for processing the IPTV broadcasting stream such as an IPTV set-top box.

The response message receiving unit 220 receives the response message including information related to the IPTV provider, corresponding to the multicast message. The response message includes the multicast IP address of the IPTV provider, and preferably includes a data field capable of including additional information set in advance by the IPTV provider such as age and gender of the user of the IPTV terminal, or the like. According to the exemplary embodiment of the present invention, the terminal receiving the multicast message sets the IP address of the source terminal to the IP address of the corresponding IPTV terminal, generates the response message in which the target IP address is set to the IPTV data collection apparatus, and transmits the generated response message to the IPTV data collection apparatus. The transmitted response message includes the multicast IP address of the IPTV provider, and the IPTV data collection apparatus may recognize the information related to the IPTV provider through the response message.

The data storing unit 300 stores the information related to the IPTV provider. The information related to the IPTV provider includes information collected by a complete research for an audience rating such as the number of viewers with respect to the individual IPTV provider from the received response message. In the case in which the additional information is further included in the received response message, the data storing unit 300 generates a separate field for the additional information to collect the additional information.

Figure 2:
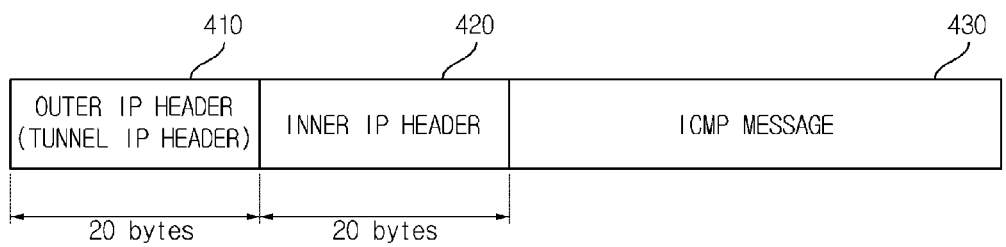
FIG. 2 is reference diagram for explaining structures of a multicast message and a response message of the IPTV data collection apparatus according to the exemplary embodiment of the present invention.

A configuration of a multicast ping packet implemented by a multicast message and a response message according to the exemplary embodiment of the present invention will be described with reference to FIG. 2. The multicast message includes an outer IP header 410, an inner IP header 420 and an ICMP message 430.

In the multicast message, a source IP address of the outer IP header is an IP address of the IPTV data collection apparatus, and a target IP address of the outer IP header is set to an IP address of a FHR of the corresponding multicast SPT.

Therefore, when a terminal of a transmission path (for example, a source terminal, a FHR of a SPT) receives the multicast message, the terminal removes the outer IP header and transmits an inner ICMP message to the corresponding transmission path (for example, the SPT). The ICMP message arrives at a terminal such as an IPTV set-top box included in the transmission path through the same path as a stream path of an IPTV provider in the multicast scheme.

A response message is generated by the terminal such as the IPTV set-top box receiving the multicast message. The response message is generated so that a source IP address thereof is set to a network address of the terminal of the transmission path and a target IP address is set to a network address of the IPTV data collection apparatus.

The outer IP header and inner IP header have data sizes capable of being processed in a general router and are set according to a communication protocol of a network to which the IPTV data collection apparatus is connected. In the present embodiment, the data size of the outer IP header and inner IP header may be 20 bytes.

An IPTV data collection apparatus and an IPTV broadcasting network based on a multicast according to the exemplary embodiment of the present invention will be described with reference to FIGS. 3 and 4.

Figure 3:
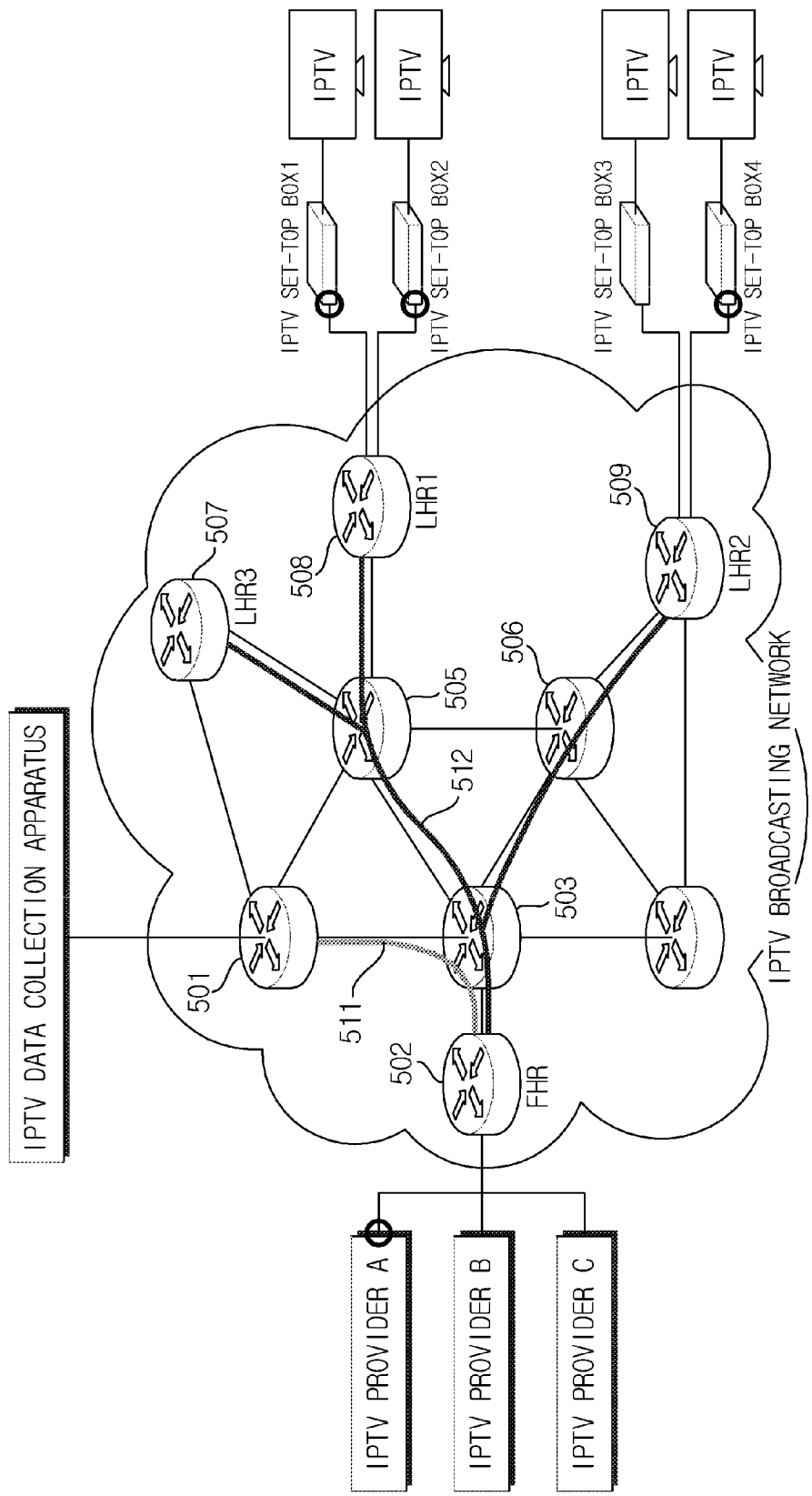
FIGS. 3 and 4 are reference diagrams for explaining the IPTV data collection apparatus and an IPTV broadcasting network based on a multicast according to the exemplary embodiment of the present invention.
Figure 4:
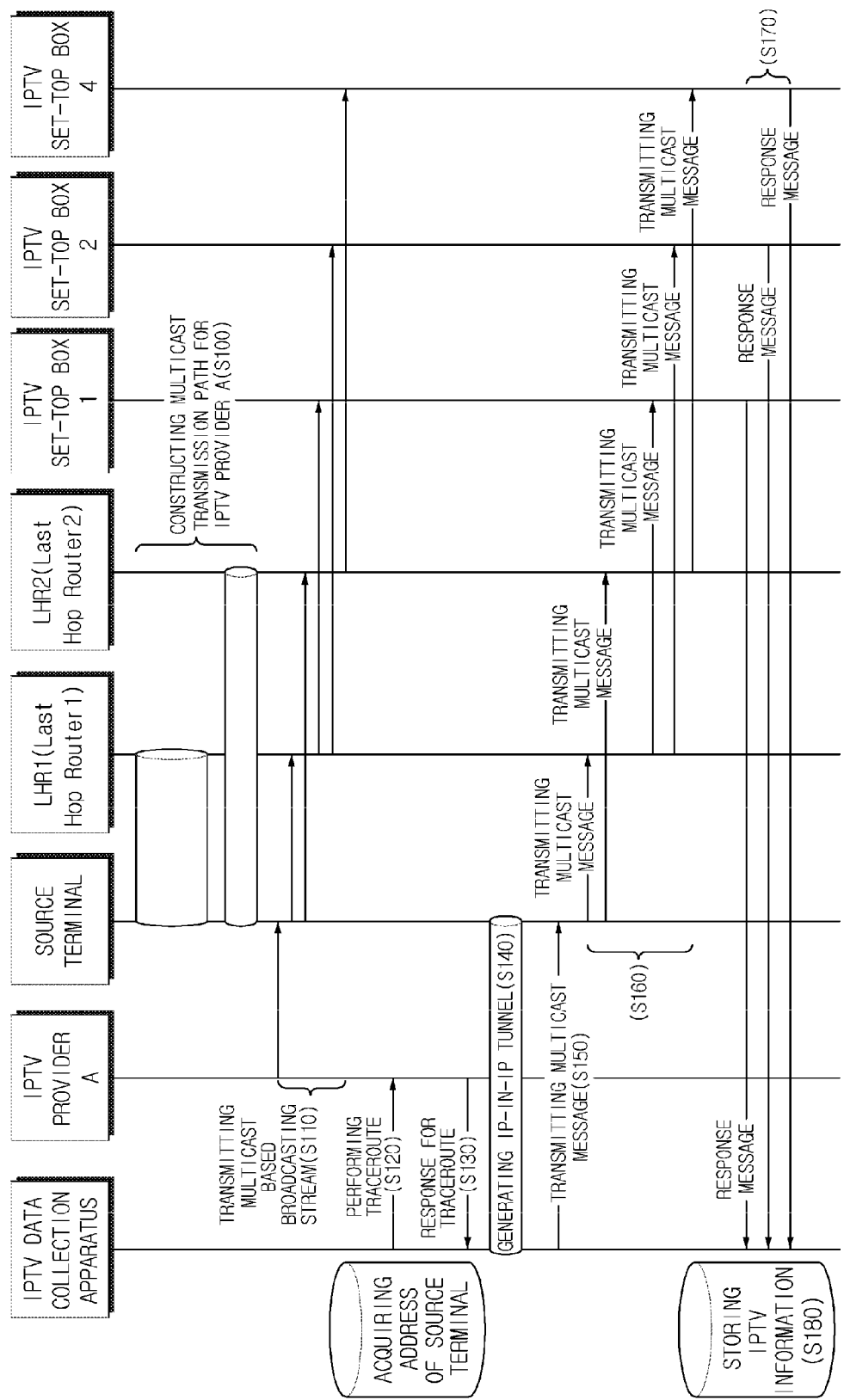

Referring to FIG. 3, the IPTV broadcasting network is configured of a network supporting a multicast routing protocol and a multicast protocol. For example, the multicast routing protocol includes a protocol independent multicast-sparse mode (PIM-SM) or a protocol independent multicast-source specific multicast (PIM-SSM), and the multicast protocol includes an Internet group management protocol (IGMP)v2 or an ICMPv3routing protocol. The PIM-SM and the PIM-SSM are operated according to RFC 4601 and RFC 4607 standards of an Internet engineer task force (IETF), and the IGMPv2 and IGMv3 are operated according to RFC 2236 and RFC 3376 standards of the IETF.

The IPTV data collection apparatus may be constructed separately from an IPTV provider to thereby be connected to the IPTV broadcasting network or be constructed together with the IPTV provider in the same system.

The IPTV provider and an IPTV set-top box are connected to the IPTV broadcasting network, and the IPTV provider transmits each broadcasting data as a multicast packet. The transmitted multicast packet is transmitted from the IPTV provider to the IPTV set-top box using a transmission path such as the SPT constructed by the multicast routing protocol and the multicast protocol.

The entire operation of the IPTV data collection apparatus and the IPTV broadcasting network based on the multicast will be described with reference to FIG. 4.

A source terminal such as a FHR 502 is connected to a last hop router 1 (LHR1) 508 and a last hop router 2 (LHR2) 509, such that a transmission path 511 with respect to an IPTV provider A is constructed in advance. The transmission path 511 may be an SPT path base on the shortest distance (S100). For example, when a user selects an IPTV provider, an IPTV set-top box of the user subscribes a multicast group related to the IPTV provider using the IGMPv2 or IGMPv3 protocol. The IPTV provider constructs a related multicast SPT at the corresponding IPTV according to the operation of the PIM-SM or PIM-SSM protocol.

The IPTV provider A transmits a multicast based broadcasting stream to the FHR 502 and the terminals belonging to the transmission path 512 (S 110). In the system as shown in FIG. 3, the FHR 502 relays the broadcasting stream to the LHR1 508 and LHR2 509 through the transmission path constructed in advance. In the case of the LHR1 508, the broadcasting stream is transmitted through the transmission path (503, 505, and 508) from the FHR 502 to the LHR1, and the case of the LHR2 509, the broadcasting stream is transmitted through the transmission path (503, 506, and 509) from the FHR 502 to the LHR2. That is, the broadcasting stream is transmitted from the IPTV provider to the IPTV set-top box along the constructed multicast SPT, and the user views a channel.

The IPTV data collection apparatus performs traceroute on the IPTV provider A (S120). As described above, the IP address of the IPTV provider for the specific broadcasting channel should be set in the IPTV data collection apparatus.

The IPTV data collection apparatus receives a response for a traceroute request from the IPTV provider and acquires a network address of the source terminal 502 based on the response (S130).

The IPTV data collection apparatus generates an IP-in-IP tunnel between the IPTV data collection apparatus and the source terminal 502 based on the acquired network address of the source terminal (S140). When the IP-in IP tunnel is generated, the IPTV data collection apparatus transmits the multicast message to the source terminal 502 (S150).

The source terminal 502 transmits the received multi-cast message to the transmission path (S160), and the terminals 508 and 509 of the transmission path transmit the response message to the IPTV data collection apparatus (S170).

The IPTV data collection apparatus receives the response message from the terminals 508 and 509 of the transmission path to store the IPTV information (S180)

Figure 5:
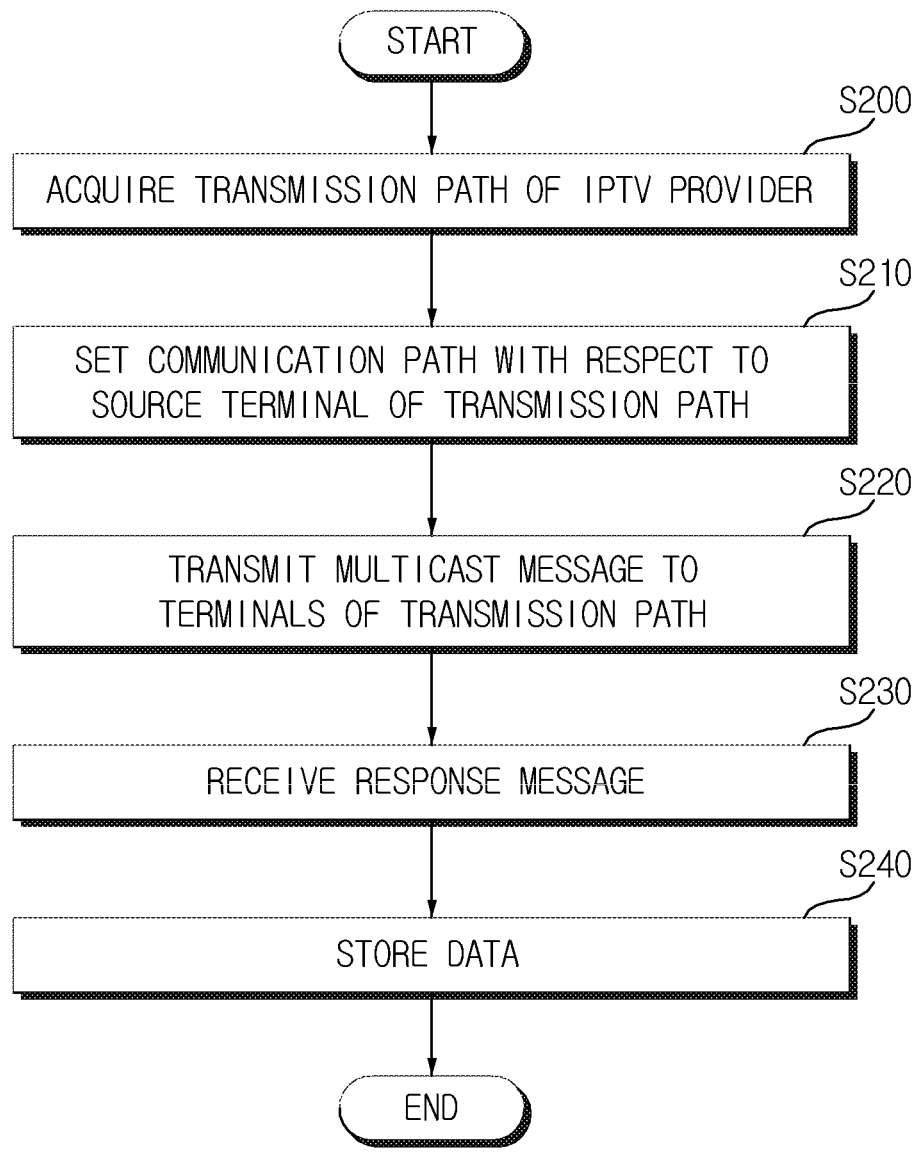
FIG. 5 is a flow chart showing an IPTV data collection method according to an exemplary embodiment of the present invention.

An IPTV data collection method using the IPTV data collection apparatus according to the exemplary embodiment of the present invention will be described with reference to FIG. 5. A description overlapped with the description of the IPTV data collection apparatus will be substituted with the above-mentioned description.

In S200, a transmission path of an IPTV provider is acquired. The IPTV data collection apparatus should acquire a network address of the IPTV provider, or the like, in order to collect information on a specific IPTV provider. The network address of the IPTV provider may be set, and be set in advance by a user or an external device. The traceroute is performed using the network address of the IPTV provider, and as a result, the transmission path of the IPTV provider is acquired.

In S210, the IPTV data collection apparatus sets a communication path for a source terminal of the transmission path. For example, the tunneling according to an IP-in-IP scheme is performed on the source terminal such as a FHR in the transmission path of the IPTV provider. The corresponding IP-in-IP tunnel may be set by the user or a control message.

In S220, a multicast message is transmitted to terminals of the transmission path. The IPTV data collection apparatus transmits the multicast message to the source terminal through the IP-in-IP tunnel, and the multicast message is transferred to the users using the IPTV through the corresponding transmission path from the source terminal, similarly to the broadcasting stream of the IPTV provider.

In S230, the IPTV data collection apparatus receives the response message. The response message is received from the terminals of the transmission path receiving the multicast message.

In S240, the IPTV data collection apparatus acquires an audience rating and other additional information related to the IPTV provider from the received response message to store the acquired information.

Figure 6:
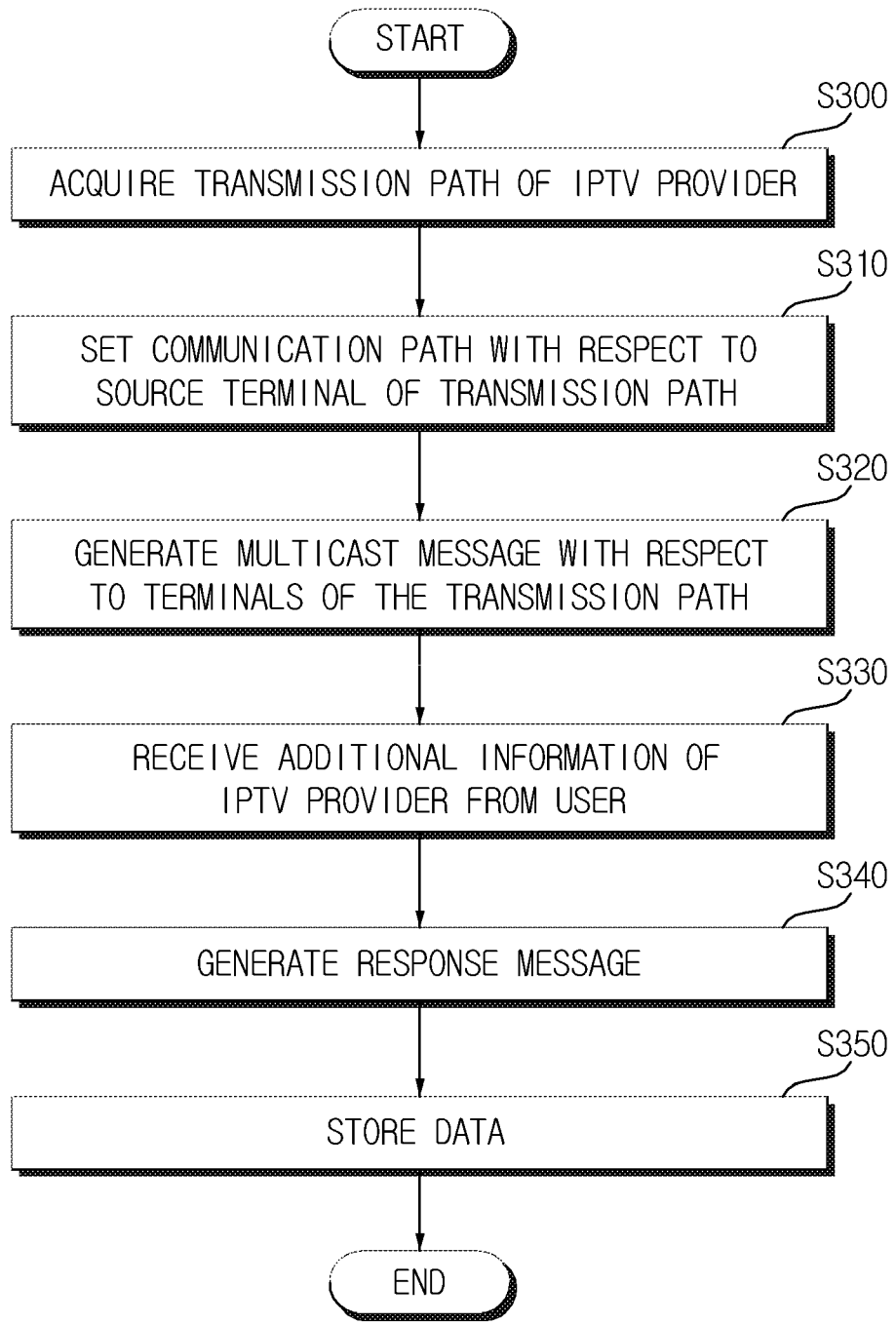
FIG. 6 is a flow chart showing an IPTV data collection method according to another exemplary embodiment of the present invention.

An IPTV data collection method in an IPTV broadcasting system including the IPTV data collection apparatus according to the exemplary embodiment of the present invention and terminals of the transmission path will be described with reference to FIG. 6. A description overlapped with that of IPTV data collection method using the IPTV data collection apparatus will be substituted with the above-mentioned description.

In S300, the transmission path of the IPTV provider is acquired.

In S310, a communication path for the IPTV data collection apparatus and the source terminal of the transmission path are set.

In S320, the multicast message is generated for the terminals of the transmission path.

In S330, additional information of the IPTV provider is received from the user through the terminal of the transmission path. For example, the terminal of the transmission path determines whether a request for the additional information such as gender, age, marital status of a user, or the like, is included in the multicast message. In the case in which the request for the additional information is present, the additional information is received from the user in a scheme in which the user information is requested on a screen of the IPTV.

In S340, the response message is generated. In the case in which the request for the additional information is present, the response message including the response for the multicast message and the additional information is generated.

In S350, the IPTV data collection apparatus stores data based on the generated response message.

Meanwhile, the embodiments according to the present invention may be implemented in the form of program instructions that can be executed by computers, and may be recorded in computer readable media. The computer readable media may include program instructions, a data file, a data structure, or a combination thereof. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. An Internet protocol television (IPTV) data collection apparatus comprising:
  a transmission path setting unit acquiring a transmission path of an IPTV provider to a plurality of IPTV set-top boxes through a terminal and setting a communication path to the terminal based at least in part on acquiring the transmission path;
  a message transmitting and receiving unit transmitting a multicast message to at least a portion of the plurality of IPTV set-top boxes using the communication path to the terminal and receiving a response message including information related to the IPTV provider and corresponding to the transmitted multicast message; and
  a data storing unit storing the information related to the IPTV provider.

2. The IPTV data collection apparatus of claim 1, wherein the message transmitting and receiving unit includes:
  a multicast transmitting unit transmitting the multicast message to at least a portion of the plurality of IPTV set-top boxes using the set communication path to the terminal; and
  a response message receiving unit receiving the response message including information related to the IPTV provider, corresponding to the multicast message.

3. The IPTV data collection apparatus of claim 2, wherein the multicast message is a message including information for determining whether the message reaches at least a portion of the plurality of IPTV set-top boxes.

4. The IPTV data collection apparatus of claim 3, wherein the message includes an inner Internet protocol (IP) header, an outer IP header, and an Internet control message protocol (ICMP) message.

5. The IPTV data collection apparatus of claim 2, wherein the response message is a message including a multicast IP address of the IPTV provider.

6. The IPTV data collection apparatus of claim 5, wherein the message includes a data field capable of including additional information set in advance by the IPTV provider.

7. The IPTV data collection apparatus of claim 1, wherein the transmission path setting unit includes:
  a path acquiring unit performing traceroute on the IPTV provider and acquiring the transmission path set in order to transmit a broadcasting stream of the IPTV provider; and
  a path setting unit setting the communication path for unicast of a message with respect to a source terminal of the acquired transmission path.

8. The IPTV data collection apparatus of claim 7, wherein the path setting unit sets an IP-in-IP tunnel as the communication path for the unicast of the message with respect to the source terminal of the transmission path.

9. An IPTV data collection method comprising:
  a transmission path setting step of acquiring a transmission path of an IPTV provider to a plurality of IPTV set-top boxes through a terminal and setting a communication path to the terminal based at least in part on acquiring the transmission path;
  a message transmitting and receiving step of transmitting a multicast message to at least a portion of the plurality of IPTV set-top boxes using the communication path to the terminal and receiving a response message including information related to the IPTV provider and corresponding to the transmitted multicast message; and
  a data storing step of storing the information related to the IPTV provider.

10. The IPTV data collection method of claim 9, wherein the message transmitting and receiving step includes:
  a multicast transmitting step of transmitting the multicast message to at least a portion of the plurality of IPTV set-top boxes using the set communication path to the terminal; and a response message receiving step of receiving the response message including information related to the IPTV provider, corresponding to the multicast message.

11. The IPTV data collection method of claim 10, wherein the multicast message is a message including information for determining whether the message reaches at least a portion of the plurality of IPTV set-top boxes, and
the response message is a message including a multicast IP address of the IPTV provider.

12. The IPTV data collection method of claim 9, wherein the transmission path setting step includes:
a path acquiring step performing traceroute on the IPTV provider and acquiring the transmission path; and
a path setting unit setting the communication path with respect to the source terminal of the transmission path.

13. An IPTV data collection method comprising:
a transmission path setting step of acquiring a transmission path of an IPTV provider to a plurality of IPTV set-top boxes through a terminal and setting a communication path to the terminal based at least in part on acquiring the transmission path;
a multicast message generating step of generating a multicast message for transmitting to at least a portion of the plurality of IPTV set-top boxes using the communication path to the terminal;
an additional information receiving step of receiving additional information set in advance by the IPTV provider from a user based on the multicast message;
a response message generating step of generating a response message including information related to the IPTV provider, corresponding to the transmitted multicast message and the received additional information of the IPTV provider; and
a data storing step of storing the information related to the IPTV provider.

* * * * *